US009759522B2

(12) United States Patent
Maryfield et al.

(10) Patent No.: US 9,759,522 B2
(45) Date of Patent: Sep. 12, 2017

(54) INFRARED LASER AUTOMATIC BORE-SIGHTING

(71) Applicant: Cubic Corporation, San Diego, CA (US)

(72) Inventors: Tony Maryfield, Poway, CA (US); Mahyar Dadkhah, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/334,099

(22) Filed: Oct. 25, 2016

(65) Prior Publication Data

US 2017/0045333 A1 Feb. 16, 2017

Related U.S. Application Data

(62) Division of application No. 14/728,133, filed on Jun. 2, 2015, now Pat. No. 9,506,725.

(Continued)

(51) Int. Cl.
*F41G 3/32* (2006.01)
*G01B 11/27* (2006.01)
(Continued)

(52) U.S. Cl.
CPC ............... *F41G 3/326* (2013.01); *F41G 1/36* (2013.01); *F41G 3/06* (2013.01); *G01B 11/272* (2013.01)

(58) Field of Classification Search
CPC .................................. G01C 15/02; G01C 3/08
See application file for complete search history.

(56) References Cited

U.S. PATENT DOCUMENTS

| 4,155,096 A | 5/1979 | Beauregard et al. |
| 2009/0220145 A1* | 9/2009 | Ootani ................. G01C 15/002 382/154 |

(Continued)

FOREIGN PATENT DOCUMENTS

| DE | 3329589 A1 | 3/1985 |
| DE | 19922412 A1 | 8/2000 |
| EP | 1992911 A2 | 11/2008 |

OTHER PUBLICATIONS

International Search Report and Written Opinion mailed Feb. 29, 2016 for International Patent Application No. PCT/US2015/033691; all pages.

*Primary Examiner* — Luke Ratcliffe
(74) *Attorney, Agent, or Firm* — Kilpatrick Townsend & Stockton (57) ABSTRACT

Techniques are disclosed for automatically bore-sighting a laser-based optical device to a weapon or other apparatus to which the optical device may be mounted (or otherwise coupled). According to certain embodiments of the invention, a reflective element such as a retro-reflector can be located on a target, and the apparatus is sighted (or otherwise oriented) to the target. While the apparatus is thus sighted, a processing unit (or other control unit) of the laser-based optical device can manipulate a laser-steering assembly to scan the field of view of a camera of the laser-based optical device with a laser to determine where, in the field of view, the reflective element is located and how the laser-steering assembly is oriented. Hill-climbing and/or other peak-detection techniques can be used to make either or both of these determinations.

14 Claims, 6 Drawing Sheets

Related U.S. Application Data

(60) Provisional application No. 62/006,717, filed on Jun. 2, 2014.

(51) Int. Cl.
*F41G 3/06* (2006.01)
*F41G 1/36* (2006.01)

(56) References Cited

U.S. PATENT DOCUMENTS

| | | |
|---|---|---|
| 2014/0110482 A1* | 4/2014 | Bay .......................... F41G 1/38 235/404 |
| 2015/0176948 A1 | 6/2015 | Varshneya et al. |
| 2015/0176949 A1 | 6/2015 | Varshneya et al. |
| 2015/0345908 A1 | 12/2015 | Maryfield et al. |

* cited by examiner

INFRARED LASER AUTOMATIC BORE-SIGHTING

CROSS-REFERENCES TO RELATED APPLICATIONS

This application is a divisional of U.S. patent application Ser. No. 14/728,133, filed Jun. 2, 2015, entitled "INFRARED LASER AUTOMATIC BORE-SIGHTING," which claims benefit under 35 USC 119(e) of U.S. Provisional Application No. 62/006,717, filed on Jun. 2, 2014, entitled "INFRARED LASER AUTOMATIC BORE-SIGHTING TECHNIQUE," which are each incorporated by reference herein in their entirety.

BACKGROUND

Laser range finders and other laser-based optical devices are frequently mounted to and used in conjunction with another apparatus, such as a weapon and/or optical scope. In military applications, such devices can be mounted to weapons or spotting scopes to enable tracking of a target and increase accuracy in aiming the weapon. When mounted to an apparatus (such as an optical scope and/or weapon), these laser-based optical devices typically need to be bore sighted to the apparatus to ensure the aim of the laser of the laser-based optical devices is aligned with the aim of the apparatus, thereby enabling the laser-based optical device to take accurate measurements (e.g., range, wind, and the like). Traditional bore-sighting techniques can be difficult and time consuming.

BRIEF SUMMARY

Techniques are disclosed for automatically bore-sighting a laser-based optical device to a weapon or other apparatus to which the optical device may be mounted (or otherwise coupled). According to certain embodiments of the invention, a reflective element such as a retro-reflector can be located on a target, and the apparatus is sighted (or otherwise oriented) to the target. While the apparatus is thus sighted, a processing unit (or other control unit) of the laser-based optical device can manipulate a laser-steering assembly to scan the field of view of a camera of the laser-based optical device with a laser to determine where, in the field of view, the reflective element is located and how the laser-steering assembly is oriented. Hill-climbing and/or other peak-detection techniques can be used to make either or both of these determinations.

According to the disclosure, an example optical device capable of automatically bore-sighting with another apparatus can comprise a mountable body configured to be mounted to the other apparatus. The mountable body can at least partly house a laser, a laser-steering assembly configured to automatically steer a laser beam generated by the laser, and a camera. The optical device can further comprise a processing unit communicatively coupled with the laser, the laser-steering assembly, and the camera, and configured to cause the optical device to perform a first scan of a field of view of the camera by using the laser-steering assembly to steer the laser beam across at least a first portion of the field of view of the camera. The processor can be further configured to cause the optical device to detect an intensity of reflected laser light above a first threshold, and in response to detecting the intensity of the reflected laser light above the first threshold, determine a location, within the field of view of the camera, of the reflected laser light, and an orientation of the laser-steering assembly at which the intensity of the reflected laser light reaches a second threshold.

The example optical device can include one or more of the following features. The optical device can include a photodetector, separate from the camera, wherein the processing unit is configured to cause the optical device to detect the intensity of reflected laser light above the first threshold using the photodetector. The processing unit can be configured to cause the optical device to determine a maximum intensity of the reflected laser light as the second threshold. The processing unit can be configured to cause the optical device to determine the location, within the field of view of the camera, of the reflected laser light by performing a second scan of the field of view of the camera by using the laser-steering assembly to steer the laser beam across at least a second portion of the field of view of the camera, the second portion of the field of view being a subset of the first portion of the field of view. The processing unit can be configured to cause the optical device to steer the laser beam at a slower rate while performing the second scan than while performing the first scan. The processing unit can be configured to, subsequent to performing the second scan of the field of view of the camera, perform a third scan of the field of view of the camera by using the laser-steering assembly to steer the laser beam across at least a third portion of the field of view of the camera, the third portion of the field of view being a subset of the second portion of the field of view. The processing unit can be configured to cause the optical device to determine either or both of the location of the reflected laser light or the orientation of the laser-steering assembly at which the intensity of the reflected laser light reaches the second threshold by reducing a power of the laser. The processing unit can be configured to cause the optical device to operate the camera at a higher frame rate during the second scan of the field of view of the camera than during the first scan of the field of view of the camera. The processing unit can be configured to cause the optical device to determine either or both of the location of the reflected laser light or the orientation of the laser-steering assembly at which the intensity of the reflected laser light reaches the second threshold by calculating an intensity value for each of one or more pixels over a plurality of frames captured by the camera. The processing unit can be configured to cause the optical device to determine either or both of the location of the reflected laser light or the orientation of the laser-steering assembly at which the intensity of the reflected laser light reaches the second threshold by calculating a geometric mean of intensity values.

According to the disclosure, an example method of automatically bore-sighting an optical device with another apparatus can include generating a laser beam with a laser of the optical device, and performing a first scan of a field of view of a camera of the optical device by steering the laser beam across at least a first portion of the field of view of the camera. The method can further include detecting an intensity of reflected laser light above a first threshold, and, in response to detecting the intensity of the reflected laser light above the first threshold, determine a location, within the field of view of the camera, of the reflected laser light, and an orientation of the laser beam at which the intensity of the reflected laser light reaches a second threshold.

The example method can include one or more of the following features. The method can comprise detecting the intensity of reflected laser light above the first threshold using a photodetector. The method can comprise determining a maximum intensity of the reflected laser light as the second threshold. Determining the location, within the field of view of the camera, of the reflected laser light can include performing a second scan of the field of view of the camera by steering the laser beam across at least a second portion of the field of view of the camera, the second portion of the field of view being a subset of the first portion of the field of view. The method can comprise steering the laser beam at a slower rate while performing the second scan than while performing the first scan. The method can comprise, subsequent to performing the second scan of the field of view of the camera, performing a third scan of the field of view of the camera by steering the laser beam across at least a third portion of the field of view of the camera, the third portion of the field of view being a subset of the second portion of the field of view. The method can comprise determining either or both of the location of the reflected laser light or the orientation of the laser beam at which the intensity of the reflected laser light reaches the second threshold by reducing a power of the laser. The method can comprise operating the camera at a higher frame rate during the second scan of the field of view of the camera than during the first scan of the field of view of the camera. The method can comprise determining either or both of the location of the reflected laser light or the orientation of the laser beam at which intensity of the reflected laser light reaches the second threshold by calculating an intensity value for each of one or more pixels over a plurality of frames captured by the camera. The method can comprise determining either or both of the location of the reflected laser light or the orientation of the laser beam at which the intensity of the reflected laser light reaches the second threshold by calculating a geometric mean of intensity values.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Laser range finders and other laser-based optical devices can be mounted to and used in conjunction with another apparatus, such as a weapon and/or optical scope. In military applications, such devices can be mounted to weapons or spotting scopes to enable tracking of a target and increase accuracy in aiming the weapon. Optical devices utilized by snipers can bring an added degree of sophistication because they may be able to detect conditions that can impact long-range shots, including range, wind, elevation, and more.

As provided herein, and broadly speaking, "bore-sighting" a laser-based optical device to an apparatus means adjusting the laser-based optical device such that a laser of the laser-based optical device illuminates a target at which the apparatus is aimed. This ensures that range, wind, and/or other measurements taken by the laser-based devices accurately reflect measurements taken with respect to the target. A weapon-mounted laser-based rangefinder, for example, would not provide accurate range measurements of a target at which the weapon is pointed if the aim of the rangefinder's laser (used to take the range measurement) is not properly aligned—or bore-sighted—with the weapon.

Embodiments of the present invention enable automatic bore-sighting of a laser-based optical device to a weapon or other apparatus to which the laser-based optical device may be mounted. (Herein, the term "mounted" is used broadly to indicate any type of physical coupling.) Using servo-controlled Risley prisms at the laser transmission optics and signal processing at the receiving optics, for example, the techniques provided herein can automatically bore-sight the laser-based optical device in seconds.

It will be understood that although embodiments describe a particular type of laser-based optical device (e.g., capable of taking wind and range measurements), the techniques described herein may apply to other types of laser-based optical devices as well, including rangefinders, optical communication systems, and the like.

Figure 1A:
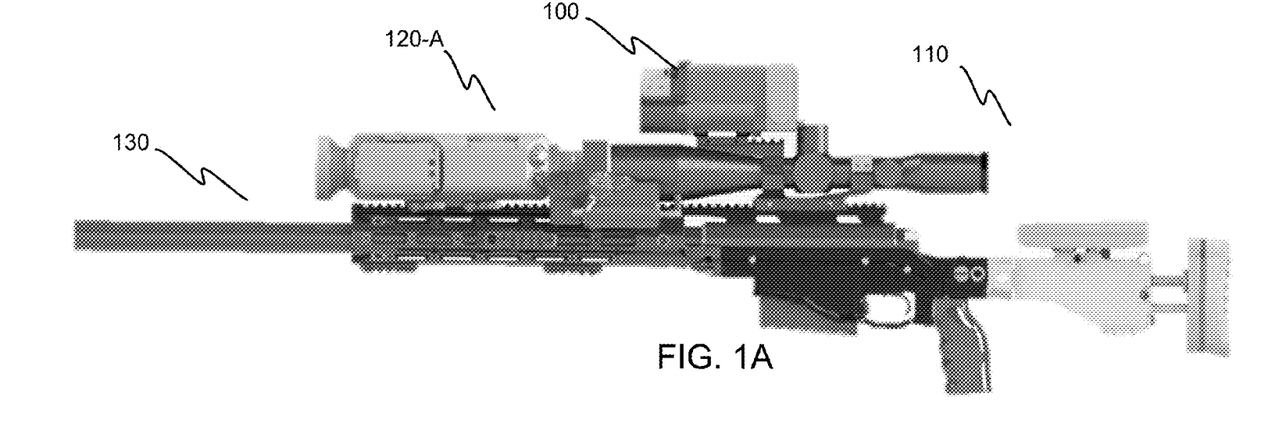
FIGS. 1A and 1B are illustrations of different example setups in which such laser-based optical devices described herein may be utilized in sniper applications.
Figure 1B:
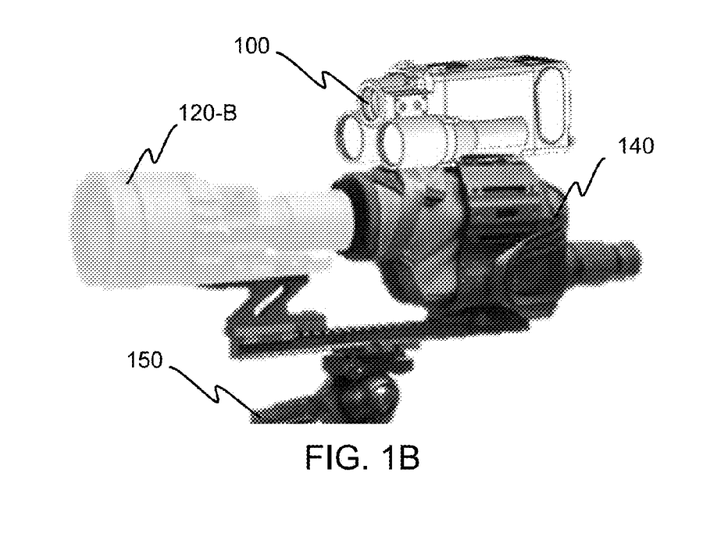

FIGS. 1A and 1B provide illustrations of different example setups in which such laser-based optical devices may be utilized in sniper applications. It will be understood, however, that laser-based optical devices may be utilized in other types of setups and in other types of applications not illustrated.

FIG. 1A illustrates a setup in which the laser-based optical device 100 is mounted to a weapon 130. Here, the weapon 130 has an optical scope 110 utilized by a user to aim the weapon at a target, and the laser-based optical device 100 is mounted to the optical scope 110. Because the optical scope 110 is used to aim the weapon 130, the laser-based optical device 100 may then be bore-sighted with the optical scope 110. In other applications and/or setups, the laser-based optical device 100 may be mounted directly to the weapon 130, which may or may not have an optical scope. One or more additional devices, such as infrared (IR) adapter 120-A may be used in conjunction with the laser-based optical device 100 and optical scope 110. For weapon-based applications such as the one shown in FIG. 1A, features such as mounting hardware and internal components of the laser-based optical device 100 and/or other devices may be adapted to maintain their integrity and/or orientation when exposed to the shock of the weapon being fired.

FIG. 1B illustrates an alternative setup in which the laser-based optical device 100 is mounted to a spotting scope 140, which is mounted to a tripod 150 (only the top of which is illustrated). Again, the laser-based optical device 100 and/or the spotting scope 140 may be utilized with one or more other devices, such as IR adapter 120-B.

Figure 2:
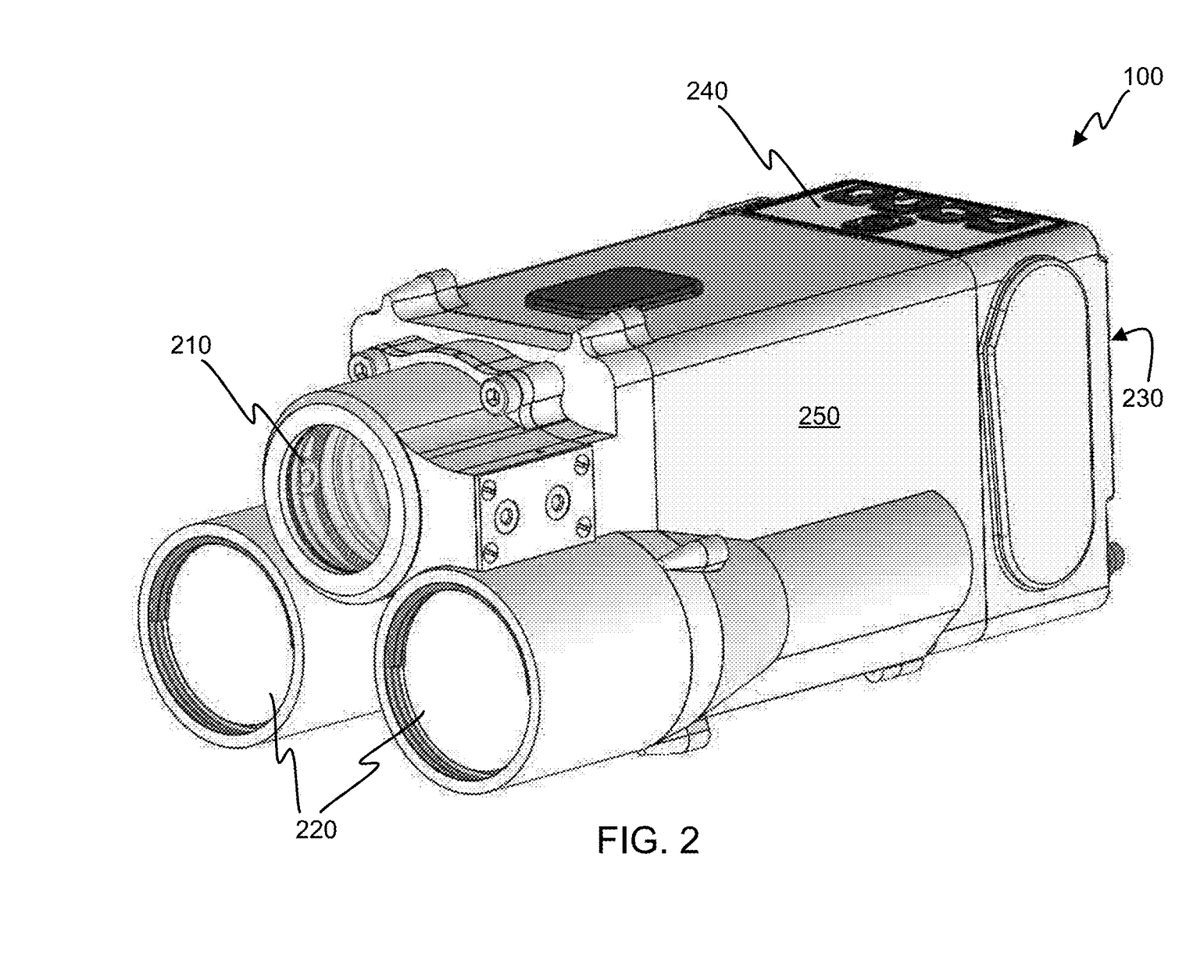
FIG. 2 is an auxiliary view of a laser-based optical device, according to an embodiment.

FIG. 2 is an auxiliary view of a laser-based optical device 100, according to an embodiment. Here, the laser-based optical device 100 is capable of taking laser-based range and wind measurements, along with providing other (non-laser-based) measurements. Other laser-based optical devices 100 may provide additional and/or alternative functions than those provided by the embodiment shown in FIG. 2. Size, weight, and/or other traits can vary, depending on desired features.

As shown in FIG. 2, this particular laser-based optical device 100 can include optics 210 through which a laser light is transmitted, and stereoscopic (e.g., right and left) receiving optics 220 through which reflected laser light is received. The optical device 100 may further include a display, e.g., on a back surface 230 of the optical device 100, to show one or more images received through one or both of the stereoscopic receiving optics 220, which can direct light toward one or more internal cameras and/or other photodetectors, and a control panel 240 with input devices (e.g., one or more buttons, switches, touchpads, touchscreens, and the like) for proving a user interface through which user input may be received. The user may provide input to initiate the automatic bore-siting techniques described herein.

The body 250 of the optical device 100 and/or components housed therein can include any of a variety of materials, depending on desired functionality, manufacturing concerns, and/or other factors. In some embodiments, the body comprises aluminum, based on the relative high thermal conductivity, strength, cheap cost, relative ease of casting/machinability, and/or other concerns. The body 250 may comprise a mountable body configured to be mounted or otherwise coupled to an apparatus, as shown in FIGS. 1A and 1B, and housing (at least partly) a laser, a laser-steering assembly, and a camera, as described in more detail below. In some embodiments, the body 250 may also house a processing unit, also described in more detail below.

General use of the optical device 100 may vary, depending on desired functionality. According to some embodiments, the user may bore-sight the laser-based optical device 100 with an apparatus (e.g., weapon, optical scope, spotting scope, etc.) to which the laser-based optical device 100 is mounted by providing an input (e.g., pressing a button on the control panel 240). Using techniques provided herein below (described in relation to FIGS. 5 and 6), the laser-based optical device 100 may then automatically bore-sight to the apparatus. Once the optical device is bore-sighted, the user may aim the apparatus toward a target and provide one or more inputs to cause the laser-based optical device 100 to take measurements, such as determining the range of the target and/or taking laser-based measurements of the cross-wind between the laser-based optical device 100 and the target. The laser-based optical device 100 may use the laser for other functions as well, such as optical communications, for example.

Additional information regarding the laser-based optical device 100 illustrated in FIG. 2 is provided in U.S. patent application Ser. No. 14/696,004 entitled "Athermalized Optics for Laser Wind Sensing" (hereafter, "the '004 application), which is incorporated by reference herein in its entirety.

Figure 3:
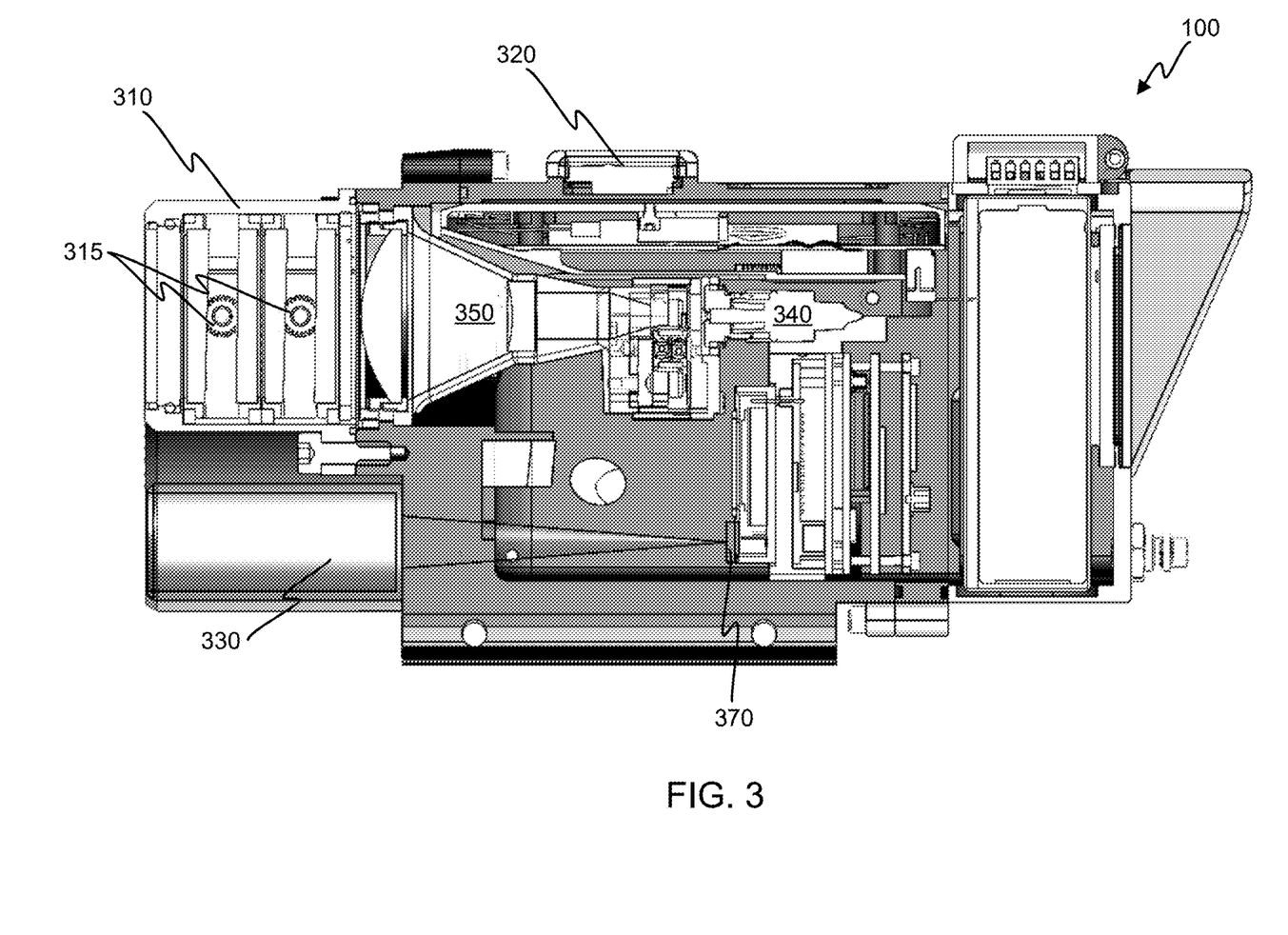
FIG. 3 is an illustration of a two-dimensional cross section of an embodiment of a laser-based optical device similar to the laser-based optical device of FIG. 2.

FIG. 3 is an illustration of a two-dimensional cross section of an embodiment of a laser-based optical device 100 similar to the laser-based optical device 100 of FIG. 2. Components, too, may be similar to those described in regard to laser-based optical device 100 of FIG. 2. In FIG. 3, however, internal components are shown. As with all figures herein, FIG. 3 provides a non-limiting embodiment. Other embodiments may add, omit, rearrange, combine, and/or separate components, depending on desired functionality. A person of ordinary skill in the art will recognize many variations to the laser-based optical device 100 shown.

The laser-based optical device 100 in FIG. 3 illustrates the use of a laser-steering assembly 310 for the transmitted laser light (e.g., laser beam). The laser-steering assembly 310 may, for example, include one or more Risley prisms capable of steering the transmitted laser light (within the field of view of the receiving optics). The laser-steering assembly 310 may be driven by one or more electrical motors (e.g., a servo motors), and may be fully automated to implement the bore-sighting techniques provided herein. In some embodiments, the laser-steering assembly 310 may also be manually adjusted (e.g., based on user input). In some embodiments, the Risley prisms can steer the transmitted laser 50 μR per step, with a 1 degree adjustment range. Other embodiments may make finer or coarser steps. The steerability of the laser light can enable the laser-based optical device 100 to be bore-sighted to a separate optical scope (e.g., a weapon-mounted scope). Thus, when bore-sighted, it can enable laser-based range finding and/or wind sensing of a target in the reticle of the weapon-mounted scope. Precision Risley prisms may be used in the steering mechanism, and they may be locked and/or designed with sufficient holding torque to preclude bore sight drift over shock (e.g., repeated gun shocks) or temperature.

Depending on desired functionality, absolute and/or relative orientation of the laser-steering assembly 310 can be tracked. In some embodiments, this may include a rolling encoder (not shown in FIG. 3) on Risley prisms implemented using a light detector to count a number of pulses in the light caused by one or more black bars (which may be applied by paint, tape, etc.) on a gear 315 controlling the rotation of the Risley prisms. The amount of rotation represented by each pulse may then depend on the size of the gear (in relation to the corresponding Risley prisms) and/or the proximity of the bars on the tape. Absolute orientation may be determined by establishing an optical stop or other "start" position. Other embodiments may employ additional or alternative techniques for determining an orientation of the laser-steering assembly 310, or an orientation and/or direction of a generated laser beam itself.

In the embodiment of FIG. 3, a laser module 340 is coupled to the transmission optical assembly 350, which, together, generate the laser light to be transmitted. According to some embodiments, the laser module can comprise a master oscillator power amplifier (MOPA) laser capable of transmitting pulsed and/or continuous wave (CW) laser light. In some embodiments, the laser is a high-efficiency MOPA laser operating at a 1550 nm wavelength and utilizing a Fabry-Perot seed. The transmission optical assembly 350 may be adjustable to vary the divergence of the generated laser beam.

The receiving optical assembly 330 (corresponding to receiving optics 220 in FIG. 2) can focus incoming light onto a camera 370. In some embodiments, the receiving optical assembly 330 may additionally or alternatively focus incoming light on a photodiode (not shown). Additional details regarding embodiments using stereoscopic receiving optics and athermalization of such optics are provided in the '004 application.

The camera 370 can selected based on its ability to sense reflected laser light. In some embodiments, the camera 370 comprises a short-wave infrared (SWIR) camera capable of detecting reflected IR light from an IR laser (when the laser module 340 comprises an IR laser). The camera 370 can be communicatively coupled with a processing unit (not shown), which can process images captured by the camera 370.

As shown in FIG. 3, the laser-based optical device 100 may include various other features, which may vary depending on desired functionality. These features may enable the laser-based optical device 100 to communicate with the user, communicate with one or more other devices, take other measurements, and/or provide other functionality. Additional details regarding these other features are provided in the '004 application.

Figure 4:
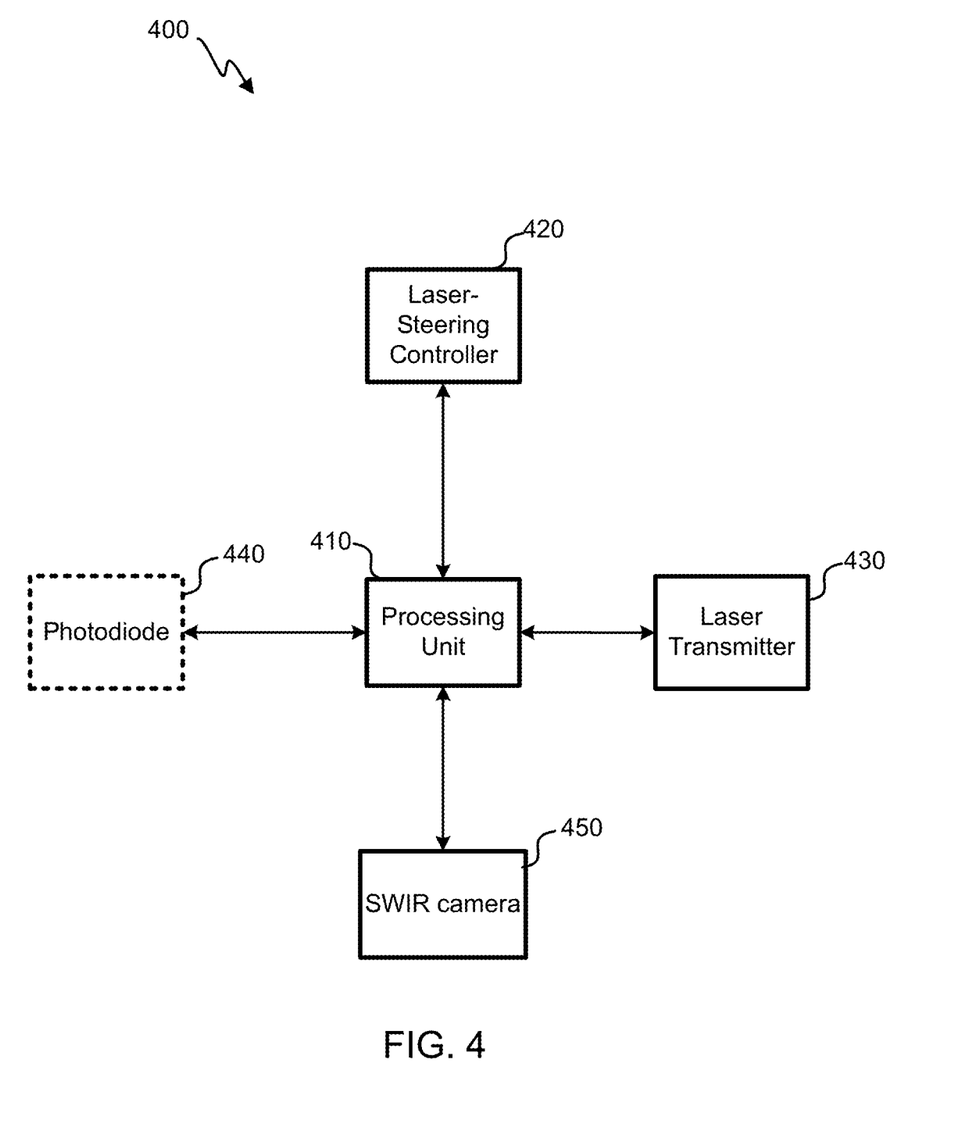
FIG. 4 is a simplified block diagram of basic electrical components of a laser-based optical device, according to an embodiment.

FIG. 4 is a simplified block diagram 400 of basic electrical components of a laser-based optical device (such as the laser-based optical devices 100 illustrated in FIGS. 1-3), according to an embodiment. As illustrated, components may include a processing unit 410, laser-steering controller 420, laser transmitter 430, and SWIR camera 450 (e.g., camera 370 of FIG. 3). Optionally, embodiments may include a photodiode 440. Alternative embodiments may add, omit, separate, substitute, and/or combine components, depending on desired functionality. Other components may include, without limitation, a CMOS camera, sensors (orientation sensors, motion sensors, and the like), GPS receiver, display, user interface, and more. A person of ordinary skill in the art will recognize many variations.

The processing unit 410 can include one or more processors configured to, among other things, manage the various electrical components, interaction with a user, and/or communication with one or more other devices. The processor can perform and/or cause the laser-based optical device 100 to perform techniques for automatic bore-sighting described herein via management of the various components illustrated in FIG. 4. The processing unit may employ any combination of hardware and/or software to perform the functions described herein.

The laser transmitter 430 may include a laser and/or any electronics utilized in the operation thereof. The laser transmitter 430 may include a laser module such as the laser module 340 of FIG. 3. The laser-steering controller 420 may include controls for manipulating the laser-steering assembly such as the laser-steering assembly 310 of FIG. 3 and/or tracking the orientation thereof.

Figure 5:
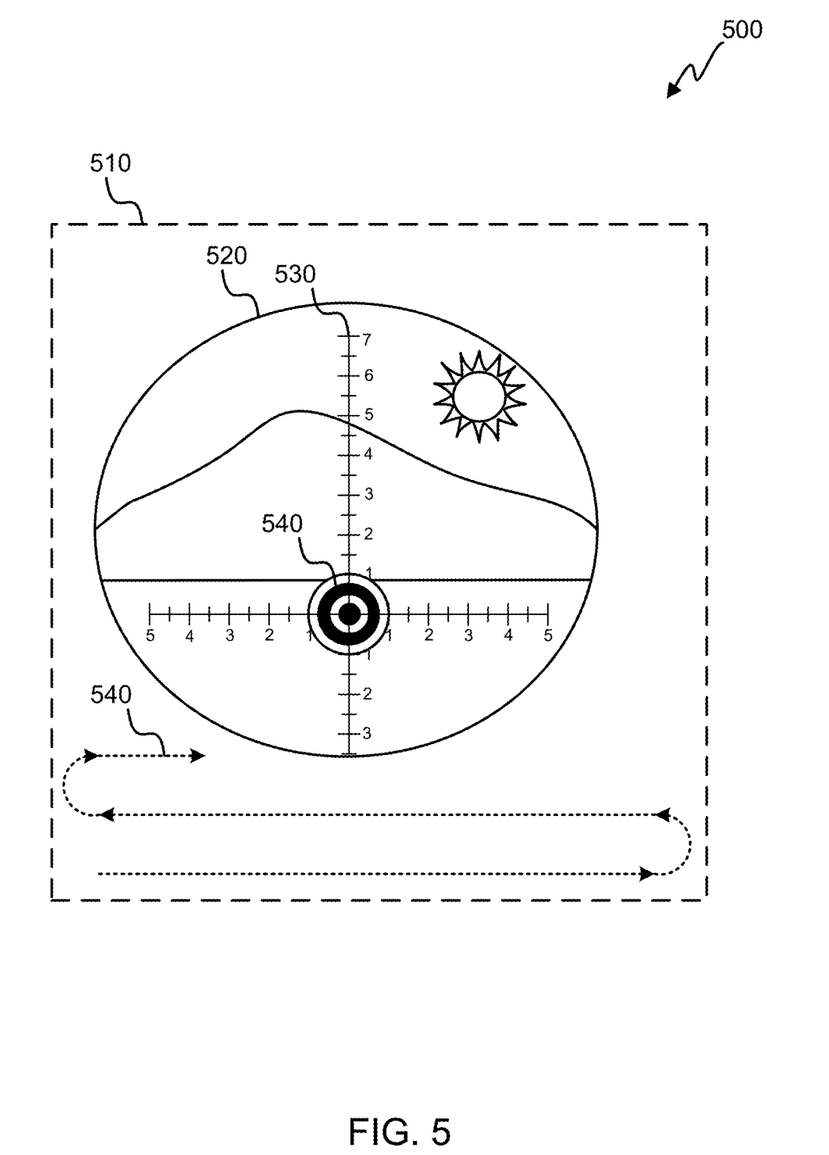
FIG. 5 is an example illustration of the view through an eyepiece of an optical scope to which a laser-based optical device is mounted, provided to help illustrate the automatic bore-sighting process that can be implemented by the laser-based optical device.

FIG. 5 is an example illustration 500 of the view through an eyepiece of an optical scope to which a laser-based optical device 100 is mounted, provided to help illustrate the automatic bore-sighting process that can be implemented by the laser-based optical device 100. Here, the setup may be similar to the setup shown in FIG. 1A, where the laser-based optical device 100 is mounted to an optical scope 110 that is sighted to a weapon 130.

Here, the image 520 is the image viewable by a user through the optical scope, which represents a field of view of the optical scope. The area 510 represents the field of view of the receiving optics of the laser-based optical device 100, which, as previously indicated, can direct light to a camera and/or light detector (e.g., avalanche photodiode (APD)). Because the laser-based optical device 100 is mounted on the optical scope, the fields of view of the optical scope (represented by the image 520) and the field of view of the laser-based optical device 100 (represented by the area 510) largely overlap. To facilitate bore-sighting of the laser-based optical device 100 to the optical scope, the field of view of the laser-based optical device 100 can be larger than that of the optical scope. However, it will be understood that the shapes, size, relative positions, and/or other features of the laser-based optical device 100 and/or optical scope may vary, depending on desired functionality and application.

The automatic bore-sighting techniques rely on the detection of reflected laser light from a target 540 by the laser-based optical device 100. Accordingly, for bore-sighting, a retro-reflector (e.g., a corner-cube retro-reflector) can be placed on the target 540, and the weapon or other apparatus to which the laser-based optical device 100 is to be bore-sighted is aimed at the retro-reflector. As shown in FIG. 5, the crosshairs 530 visible through the optical scope are aimed at a target 540, which at the time of bore-sighting, would have a retro-reflector (not shown) placed thereon, preferably at the center of the crosshairs 530. (Once bore-sighted, the laser-based optical device 100 can then be used on targets with no retro-reflectors.)

The laser-based optical device 100 then initiates the bore-sighting process (e.g., based on a user input), by generating a laser beam and scanning its field of view (area 510) by using the laser-steering assembly to steer the laser beam across at least a first portion of the field of view, while detecting the intensity of the reflected light with the camera and/or other photodetector.

In FIG. 5, item 540 represents a scan pattern of the laser. And although a raster pattern is illustrated, embodiments may utilize any of a variety of scan patterns, which may be at least partly dependent on the type of light-steering mechanism(s) utilized. In some embodiments, the estimated or detected spot size of the laser may impact the pattern of the scan. Other embodiments may simply assume a small spot size to ensure the pattern is tight enough to adequately scan the entire area 510.

Because the retro-reflector directs the laser light directly back toward the laser-based optical device 100, the intensity reflected laser light when the retro-reflector is illuminated is likely far greater than the intensity during the rest of the scan. Thus, the laser-based optical device 100 may easily detect when the retro-reflector is illuminated.

With this in mind, the laser-based optical device 100 may have a certain threshold for reflected laser light intensity (e.g., above the reflected laser light intensity when typical objects are illuminated, but below the reflected laser light intensity when the retro-reflector is illuminated). When the threshold is met or exceeded, it may indicate that the detected laser light is being reflected off of the retro-reflector. This threshold may be predetermined, in which case variables such as distance at which the target is located, size of the retro-reflector (which can impact beam spread), laser power, and the like, may also be predetermined, so that the intensity of laser light when reflected off of the retro-reflector is near expected values (which meet or exceed the predetermined threshold). Alternatively, the laser-based optical device 100 may dynamically determine the threshold by measuring the reflected light during a scan to establish average intensity values of the scan, and determine when the measured intensity value exceeds that average by a certain amount. Alternatively, establishing the threshold may simply mean scanning the whole field of view (area 510) and determining the spot within the field of view with the highest measured intensity value.

Depending on the desired functionality, the scan may be performed in a variety of ways. For instance, a camera may be used during the scan to detect the reflected laser light. In this case, the camera may take video at a certain number of frames per second (fps) (e.g., 15 fps, 30 fps, 60 fps, etc.). Depending on the steering mechanism used by the laser-based optical device 100, the camera may not know, at any given time during the scan, where the laser is pointed. However, when the one or more of the camera's pixels detect an intensity above the threshold at a given frame, the laser-based optical device 100 can then determine that the retro-reflector may have been at least partially illuminated between the previous captured frame and the current frame. And, as indicated previously, because the laser-based optical device 100 can track the relative and/or absolute position of the laser-steering assembly, it can track the position of the laser-steering assembly at each frame. Thus, according to some embodiments, the laser-based optical device 100 can then perform a finer scan to more accurately determine the position of the laser-steering assembly at which the retro-reflector is illuminated.

As a generic example, a laser-based optical device 100 may perform a raster scan of its field of view (area 510), while detecting reflected laser light by capturing images with a camera at a certain frame rate, starting at frame 1 and proceeding to frames 2, 3, and so on. At each frame, a processing unit of the laser-based optical device 100 determines an orientation of the laser-steering assembly. At frame 4, no pixels detect an intensity of reflected laser light above the established threshold, but at frame 5, at least one pixel of the camera does. The laser-based optical device 100 can then determine the orientations of the laser-steering assembly at both frames 4 and 5 and retrace the scan pattern to more accurately determine the orientation of the laser-steering assembly at which the intensity of the reflected laser light is brightest. For example, the laser-based optical device 100 may scan the same area more slowly and/or with more accuracy, taking 10 additional frames to scan the same area previously scanned between frames 4 and 5.

Thus, techniques can involve a first (coarse) scan and a second (fine) scan. In some embodiments, detecting the intensity of the reflected laser light during the first scan may be performed by a photodiode, and subsequently a camera is used during the second scan to determine a location where, within the field of view of the laser-based optical device 100, the retro-reflector is located. Such embodiments may provide advantages in speed because a photodiode is capable of quickly detecting the intensity of reflected laser light, whereas detection by a camera is at the relatively slow pace of the frame rate. In some embodiments, the speed at which the laser-steering assembly steers the laser beam during the second scan is slower than during the first scan. In such cases, the power of the laser may be reduced to help avoid saturation of the pixels. In some embodiments, the camera can operate at a higher frame rate than during the first scan. Depending on desired functionality, some embodiments may employ one or more additional scans (e.g., a third, fourth, fifth, etc.), each with increasing granularity.

To help ensure that the laser beam is directly illuminating a retro-reflector (e.g., the center, rather than an edge, of the laser beam is illuminating the retro-reflector), the laser-based optical device 100 may employ hill-climbing and/or other peak-finding techniques to determine the orientation of the laser-steering assembly at which the intensity of the reflected laser light is brightest. (Given the Gaussian return spot divergence of the retro-reflectors, this is typically at the center of the laser beam.) Again, the power of the laser may be reduced to help avoid saturation of pixels of the camera during this process.

In one embodiment, after detecting the location, within the field of view (area 510) of the laser-based optical device 100 at which the retro-reflector is located using one or more scans, the laser-based optical device 100 can then steer the laser beam across the location in a horizontal direction to determine the horizontal orientation of the laser-steering assembly at which the intensity of the reflected laser light is brightest. This determination can be made by calculating an intensity value for each of the one or more pixels for which the intensity value exceeds the threshold over a plurality of frames (as the laser beam is moved horizontally). The laser-steering assembly is then positioned at the (horizontal) orientation at which the intensity of the reflected laser light is brightest, and the process is repeated in a vertical direction. The laser beam is then determined to be centered on the retro-reflector once the laser-steering assembly is oriented at the vertical and horizontal orientations at which the intensity of the reflected laser light is determined to be the brightest.

Additionally or alternatively, saturated values may be used, and a geometric mean of the saturated values can be used to determine a center point. For example, in some embodiments, the −3 dB points (i.e., points at which intensity is half the saturated value) on either side of a series of saturated intensity measurements are determined, and the geometric mean between these points is determined as the center point.

As an additional note regarding FIG. 5, FIG. 5 is provided to help illustrate the automatic bore-sighting process from the perspective of the overlapping fields of view of the laser-based optical device 100 (area 510) and optical scope (image 520). Although the image 520 is viewable through the eyepiece of the optical scope, a user does not need to look though the eyepiece during the automatic bore-sighting process.

Figure 6:
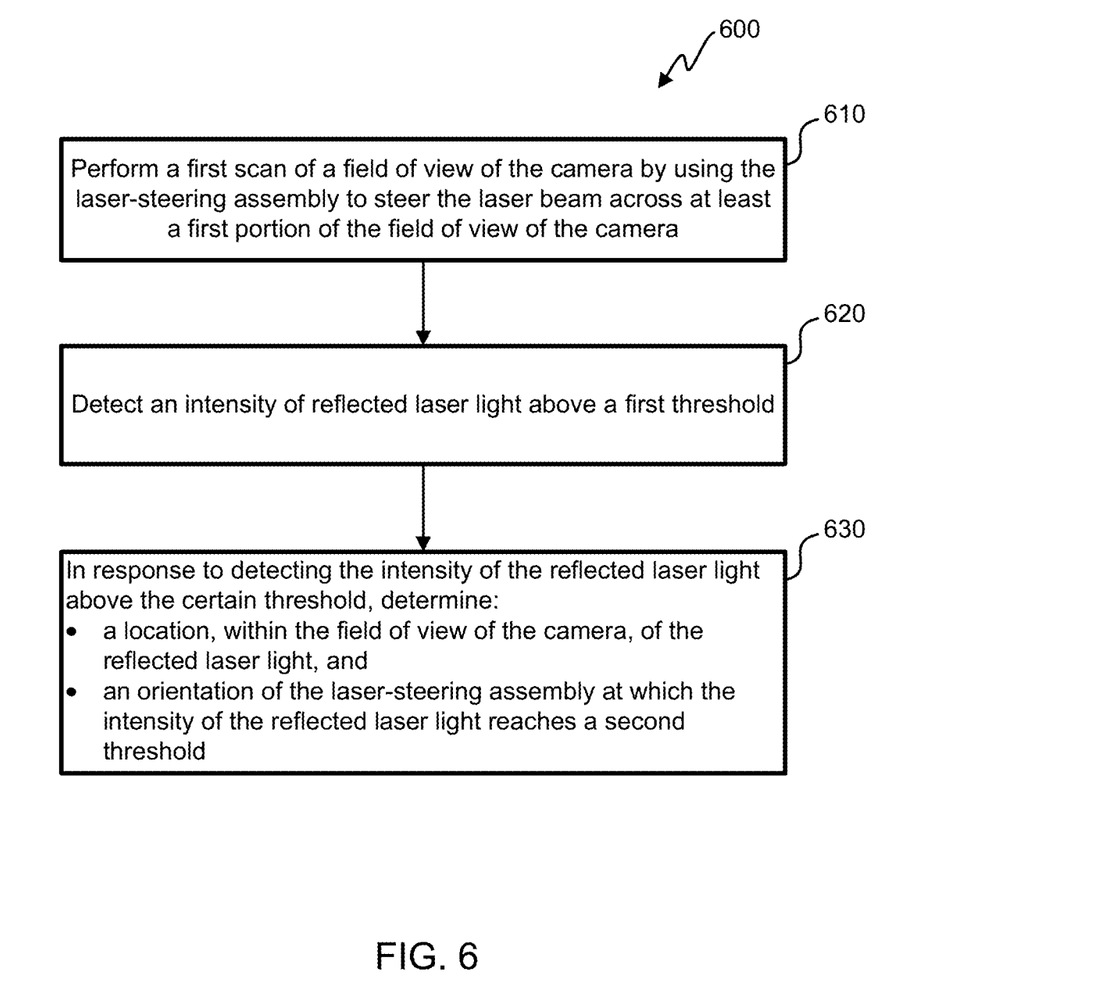
FIG. 6 is a flow diagram illustrating a method of automatically bore-sighting an optical device with another apparatus, according to one embodiment.

FIG. 6 is a flow diagram illustrating a method 600 of automatically bore-sighting an optical device with another apparatus, according to one embodiment. The optical device can correspond to a laser-based optical device 100 as discussed herein and shown in FIGS. 1A-3. Means for performing one or more of the functions shown in the blocks of method 600 can be performed by one or more components of an optical device, as illustrated in FIGS. 1A-4.

In particular, as described herein, an optical device can comprise a mountable body configured to be mounted to another apparatus, such as an optical scope, weapon, and the like. The mountable body can house, at least partly, a laser (e.g., laser transmitter 430 of FIG. 4), a laser-steering assembly (e.g., laser-steering assembly 310 of FIG. 3, which may be controlled by laser-steering controller 420 of FIG. 4) configured to automatically steer a laser beam generated by the laser, and a camera (e.g., camera 370 of FIG. 3 and SWIR camera 450 of FIG. 4). The optical device can further comprise a processing unit communicatively coupled with the laser, laser-steering assembly, and the camera, and configured to cause the optical device (using one or more of the components thereof) to perform one or more of the functions illustrated in the blocks of method 600. It will be understood that other embodiments may carry out the functions of method 600 in a different manner and/or in a different order. A person of ordinary skill in the art will recognize many variations.

At block 610 a first scan of a field of view of the camera is performed by using the laser steering assembly to steer the laser beam across at least a first portion of the field of view of the camera. Here, the field of view of the camera may be representative and/or coextensive with the field of view of the laser-based optical device 100 (e.g., area 510 of FIG. 5), because the receiving optics of the laser-based optical device 100 may be directing light onto the camera. As indicated previously, however, a photodetector separate from the camera (e.g., an APD) may be used to detect the intensity of reflected laser light during the first scan.

At block 620, an intensity of reflected laser light above a first threshold is detected. As indicated previously, the threshold may be predetermined or determined dynamically by the laser-based optical device 100. In some embodiments, the threshold may be set to allow for detection of the retro-reflector when the retro-reflector is only partially illuminated (e.g., illuminated by an edge) of the laser beam.

At block 630, in response to detecting the intensity of the reflected laser light above the certain threshold a location, within the field of view of the camera, of the reflected laser light, and an orientation of the laser-steering assembly at which the intensity of the reflected laser light reaches a second threshold is determined. Here, the second threshold may be a determination of a maximum intensity of reflected laser light.

As indicated above, a second scan (and, potentially, subsequent scans) may be used in either or both determinations at block 630. During the second scan the laser-steering assembly can be used to steer the laser beam across at least a second portion of the field of view of the camera, where the second portion of the field of view is a subset of the first portion of the field of view. (In some embodiments, a third scan may be performed where the laser-steering assembly can be used to steer the laser beam across at least a third portion of the field of view of the camera, where the third portion of the field of view is a subset of the second portion of the field of view.) As indicated above, the laser beam may be steered at a slower rate while performing the second scan than while performing the first scan. Additionally or alternatively, the camera is operated at a higher frame rate during the second scan than during the first scan. In some embodiments, either or both determinations at block 630 may be made, at least in part, by reducing power on the laser is reduced. In some embodiments, either or both determinations determination at block 630 may be made, at least in part, by calculating an intensity value for each of one or more pixels over a plurality of frames captured by the camera. In some embodiments, either or both determinations determination at block 630 may be made, at least in part, by calculating a geometric mean of intensity values.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Computer programs incorporating various features of the present invention may be encoded on various computer readable storage media; suitable media include magnetic media, optical media, flash memory, and the like. Non-transitory computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. A method of automatically bore-sighting an optical device with another apparatus, the method comprising:
generating a laser beam with a laser of the optical device;
performing a first scan of a field of view of a camera of the optical device by steering the laser beam across at least a first portion of the field of view of the camera;
detecting an intensity of reflected laser light above a first threshold;
in response to detecting the intensity of the reflected laser light above the first threshold:
determining a location, within the field of view of the camera, of the reflected laser light by performing a second scan of the field of view of the camera by steering the laser beam across at least a second portion of the field of view of the camera, the second portion of the field of view being a subset of the first portion of the field of view; and
determining an orientation of the laser beam at which the intensity of the reflected laser light reaches a second threshold; and
determining either or both of the location of the reflected laser light or the orientation of the laser beam at which the intensity of the reflected laser light reaches the second threshold by reducing a power of the laser.

2. The method of automatically bore-sighting an optical device with another apparatus of claim 1, further comprising detecting the intensity of reflected laser light above the first threshold using a photodetector.

3. The method of automatically bore-sighting an optical device with another apparatus of claim 1, further comprising determining a maximum intensity of the reflected laser light as the second threshold.

4. The method of automatically bore-sighting an optical device with another apparatus of claim 1, further comprising steering the laser beam at a slower rate while performing the second scan than while performing the first scan.

5. The method of automatically bore-sighting an optical device with another apparatus of claim 1, further comprising, subsequent to performing the second scan of the field of view of the camera, performing a third scan of the field of view of the camera by steering the laser beam across at least a third portion of the field of view of the camera, the third portion of the field of view being a subset of the second portion of the field of view.

6. The method of automatically bore-sighting an optical device with another apparatus of claim 1, further comprising operating the camera at a higher frame rate during the second scan of the field of view of the camera than during the first scan of the field of view of the camera.

7. A method of automatically bore-sighting an optical device with another apparatus, the method comprising:
generating a laser beam with a laser of the optical device;
performing a first scan of a field of view of a camera of the optical device by steering the laser beam across at least a first portion of the field of view of the camera;
detecting an intensity of reflected laser light above a first threshold;
in response to detecting the intensity of the reflected laser light above the first threshold:
determining a location, within the field of view of the camera, of the reflected laser light by performing a second scan of the field of view of the camera by steering the laser beam across at least a second portion of the field of view of the camera, the second portion of the field of view being a subset of the first portion of the field of view; and
determining an orientation of the laser beam at which the intensity of the reflected laser light reaches a second threshold; and
determining either or both of the location of the reflected laser light or the orientation of the laser beam at which the intensity of the reflected laser light reaches the second threshold by calculating an intensity value for each of one or more pixels over a plurality of frames captured by the camera.

8. The method of automatically bore-sighting an optical device with another apparatus of claim 7, further comprising steering the laser beam at a slower rate while performing the second scan than while performing the first scan.

9. The method of automatically bore-sighting an optical device with another apparatus of claim 7, further comprising, subsequent to performing the second scan of the field of view of the camera, performing a third scan of the field of view of the camera by steering the laser beam across at least a third portion of the field of view of the camera, the third portion of the field of view being a subset of the second portion of the field of view.

10. The method of automatically bore-sighting an optical device with another apparatus of claim 7, further comprising operating the camera at a higher frame rate during the second scan of the field of view of the camera than during the first scan of the field of view of the camera.

11. A method of automatically bore-sighting an optical device with another apparatus, the method comprising:
generating a laser beam with a laser of the optical device;
performing a first scan of a field of view of a camera of the optical device by steering the laser beam across at least a first portion of the field of view of the camera;
detecting an intensity of reflected laser light above a first threshold;
in response to detecting the intensity of the reflected laser light above the first threshold:
determining a location, within the field of view of the camera, of the reflected laser light by performing a second scan of the field of view of the camera by steering the laser beam across at least a second portion of the field of view of the camera, the second portion of the field of view being a subset of the first portion of the field of view; and
determining an orientation of the laser beam at which the intensity of the reflected laser light reaches a second threshold; and
determining either or both of the location of the reflected laser light or the orientation of the laser beam at which the intensity of the reflected laser light reaches the second threshold by calculating a geometric mean of intensity values.

12. The method of automatically bore-sighting an optical device with another apparatus of claim 11, further comprising steering the laser beam at a slower rate while performing the second scan than while performing the first scan.

13. The method of automatically bore-sighting an optical device with another apparatus of claim 11, further comprising, subsequent to performing the second scan of the field of view of the camera, performing a third scan of the field of view of the camera by steering the laser beam across at least a third portion of the field of view of the camera, the third portion of the field of view being a subset of the second portion of the field of view.

14. The method of automatically bore-sighting an optical device with another apparatus of claim 11, further comprising operating the camera at a higher frame rate during the second scan of the field of view of the camera than during the first scan of the field of view of the camera.

* * * * *